Dec. 15, 1964 A. G. LLOYD 3,161,837
SELF-OSCILLATORY DIRECT-CURRENT TO
ALTERNATING-CURRENT INVERTERS WITH
MAGNETIC AMPLIFIER CONTROLS
Filed July 27, 1961 2 Sheets-Sheet 1
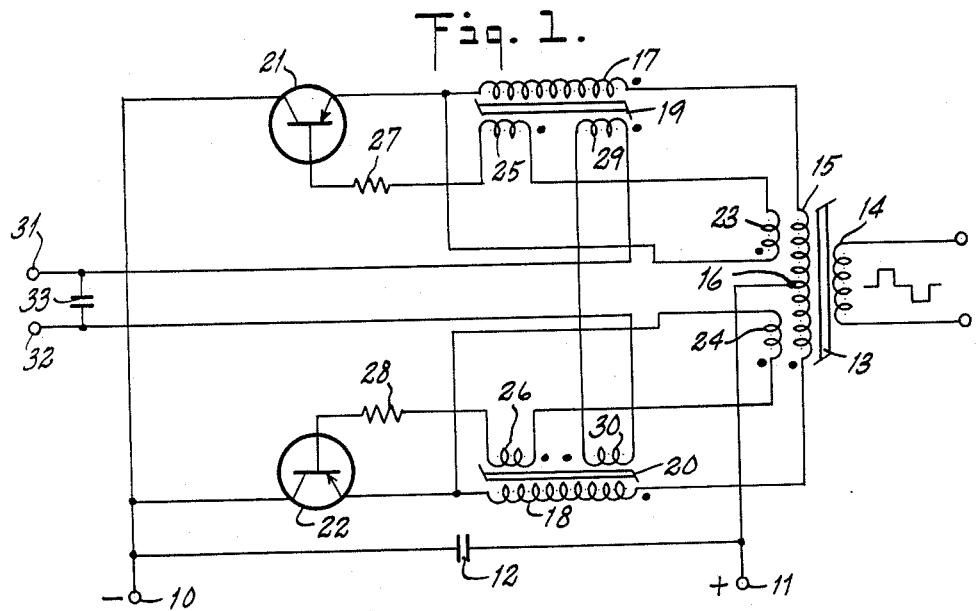
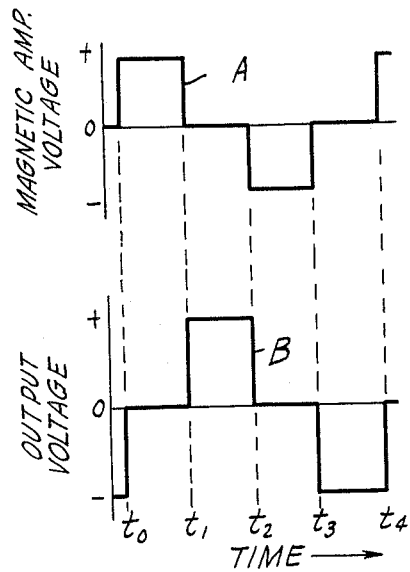
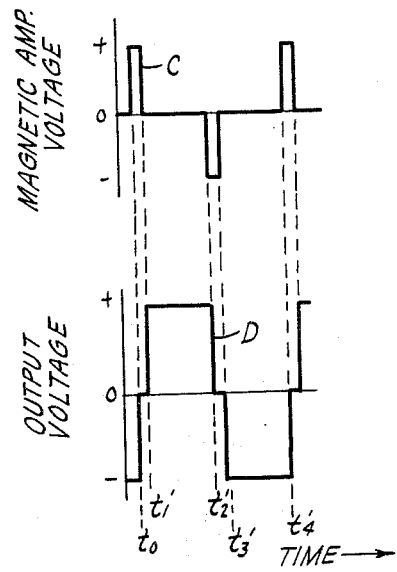
INVENTOR.
ALAN G. LLOYD
BY John A. Harvey
ATTORNEY Dec. 15, 1964 A. G. LLOYD 3,161,837
SELF-OSCILLATORY DIRECT-CURRENT TO
ALTERNATING-CURRENT INVERTERS WITH
MAGNETIC AMPLIFIER CONTROLS
Filed July 27, 1961 2 Sheets-Sheet 2

INVENTOR.
ALAN G. LLOYD
BY John A. Harvey
ATTORNEY

United States Patent Office 3,161,837
Patented Dec. 15, 1964

3,161,837
SELF - OSCILLATORY DIRECT - CURRENT TO ALTERNATING-CURRENT INVERTERS WITH MAGNETIC AMPLIFIER CONTROLS
Allan G. Lloyd, Newark, N.J., assignor to The Daven Company, Livingston, N.J., a corporation of Delaware
Filed July 27, 1961, Ser. No. 127,337
15 Claims. (Cl. 331—113)

The present invention relates to self-oscillatory direct-current to alternating-current inverters and, particularly, to such inverters utilizing transistor conductance control devices.

Self-oscillatory direct-current to alternating-current inverters have utility in many applications, particularly where it is desired to transform a relatively low unidirectional voltage to a higher unidirectional voltage by use of an inverter providing an alternating current output which is then suitably rectified and filtered. It is often desirable that the average amplitude or frequency of the alternating output voltage of the inverter be controllable in a simple yet effective manner by control over an operating characteristic of the inverter.

It is an object of the present invention to provide a new and improved self-oscillatory direct-current to alternating-current inverter in which an operating characteristic may be readily controlled at will by a unidirectional control current.

It is a further object of the invention to provide an improved self-oscillatory direct-current to alternating-current inverter particularly suited for controlled adjustment of its operating frequency to any value within either a relatively wide or a relatively narrow frequency range as desired in a particular application.

It is an additional object of the invention to provide a novel self-oscillatory direct-current to alternating-current inverter having a relatively stable operating frequency characteristic yet having an output amplitude characteristic which may be readily adjusted over a substantial range, and readily controlled, by a unidirectional control current.

Other objects and advantages of the invention will appear as the detailed description thereof proceeds in the light of the drawings forming a part of this application and in which:

FIG. 1 is a circuit diagram of a self-oscillatory direct-current to alternating-current inverter embodying the present invention in a particular form, and FIGS. 2a and 2b graphically represent certain operating characteristics of the FIG. 1 inverter and are used as an aid in explaining its operation;

Figure 3:
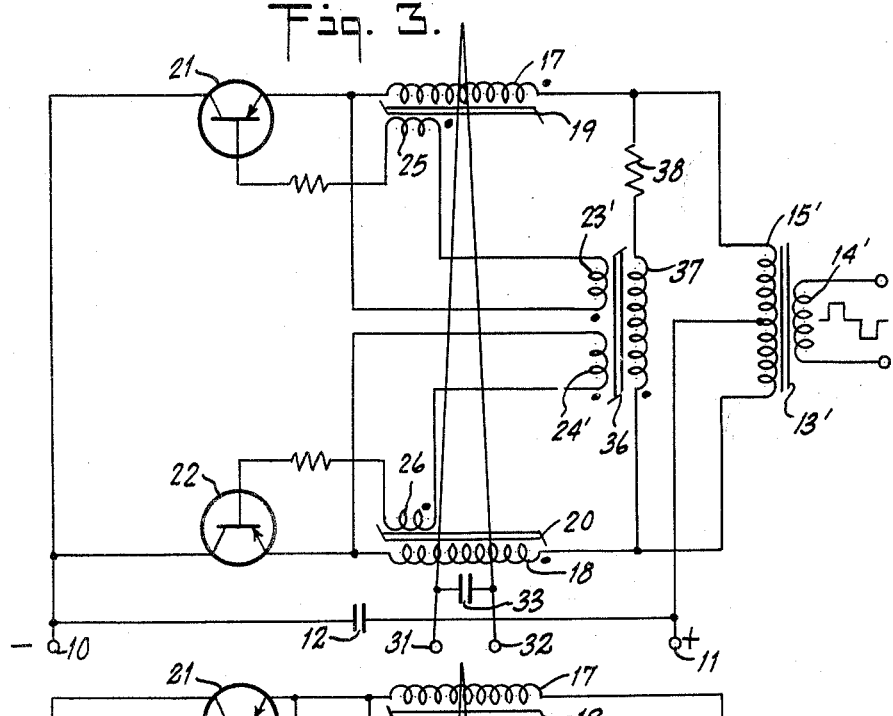
FIG. 3 is a circuit diagram of a direct-current to alternating-current inverter embodying the present invention in a modified form.

Referring now more particularly to FIG. 1, the self-oscillatory inverter having the circuit arrangement there shown includes an input circuit 10, 11 adapted to be energized from a suitable source of unidirectional power, a condenser 12 being connected in shunt to this input circuit to provide a path of low electrical impedance across it for frequencies corresponding to the fundamental and harmonic frequency of operation of the inverter. The inverter includes a saturable core output transformer 13 having a secondary winding 14 providing an inverter output circuit and having a center tapped primary winding 15. The center tap 16 of this primary winding is connected to the positive terminal 11 of the input energizing circuit. The end terminals of the primary winding 15 are coupled through individual windings 17 and 18 of a pair of magnetic amplifiers 19 and 20, respectively, and through the emitter-collector electrodes of individual transistor conductance control devices 21 and 22 to the negative terminal 10 of the input energizing circuit. The output transformer 13 is provided with feedback windings 23 and 24, and these are connected in series with individual ones of feedback windings 25 and 26 provided on the respective magnetic amplifiers 19 and 20 to the emitter electrode and base electrode of individual ones of the transistors 21 and 22. In particular feedback windings 23 and 25 are connected to the emitter and base electrodes of the transistor 21 with regenerative polarity, and the feedback windings 24 and 26 are likewise connected with regenerative polarity between the emitter and base electrodes of the transistor 22. A series current limiting resistor 27 is included in the base electrode circuit of the transistor 21 and a series current limiting resistor 28 is likewise included in the base electrode circuit of the transistor 22 in conventional manner to limit the magnitude of the base current. The magnetic amplifiers 19 and 20 are provided with control windings 29 and 30 which are connected in series in a control circuit 31, 32 adapted to be energized by a source of unidirectional current. A condenser 33 is connected in shunt to the control circuit to provide a path of low impedance for the second and higher order harmonics of the current appearing in the control circuit by reason of the operation of the magnetic amplifiers 19 and 20.

Consider now the operation of the inverter just described. Assume that when the unidirectional energizing source, not shown, is first connected to the input circuit terminals 10 and 11 the transistor 21 begins to conduct a larger value of current than does the transistor 22. The principal current flow is then from the terminal 11 through the upper half of the primary winding 15 of the transformer 13 and through the winding 17 of the magnetic amplifier 19 and the transistor 21 to the negative terminal 10. Assume further that the remanence of the core of the transformer 13 and that of the magnetic amplifier 19 is such at this time that this initial current in flowing through the transformer winding 15 and the magnetic amplifier winding 17 produces a magnetic flux in their associated cores which tends to increase toward magnetic saturation in one polarity thereof. The inductance of the transformer primary winding 15 under this condition is appreciably smaller than the inductance of the amplifier winding 17 since the magnetizing current flowing at this time is a relatively small fraction of the full load current of the transformer 13. Accordingly, the major portion of the input energizing voltage is impressed across the amplifier winding 17 and the magnetic flux in the core of the amplifier structure increases at a constant rate toward magnetic saturation.

As it does so, two events take place. A control voltage of substantially constant amplitude and of pulse wave form is induced in the winding 25 of the magnetic amplifier and is applied between the emitter and base electrodes of the transistor 21. This induced voltage has such polarity as to render this transistor more fully conductive, whereby its internal resistance decreases and a larger value of input energizing voltage is thereupon impressed across the amplifier winding 17, a condition which is accumulative and quickly renders the transistor 21 fully conductive. At the same time, a similar voltage is induced in the amplifier winding 29 and this voltage causes a current to flow through the condenser 33 and the winding 30 of the magnetic amplifier 20 to produce a magnetic flux in the core of the latter having such magnetic polarity as to reset this amplifier. This change of the magnetic flux in the core of the amplifier 20 induces a voltage in the amplifier winding 26 which is applied between the emitter and base electrodes of the transistor 22 with such polarity as to tend to maintain the latter non-conductive.

Saturable core magnetic devices are known to have a constant volt-second magnetic characteristic; that is, the product of the voltage impressed across an energizing winding of the device multiplied by the time in seconds required for the core of the device to change from magnetic saturation in one polarity to magnetic saturation in the opposite polarity is equal to a constant. Assume then that the core of the magnetic amplifier 19 initially had saturation remanence so that a given time interval is required for it to become saturated in opposite magnetic polarity by the current now flowing through the amplifier winding 17, and additionally assume that the unidirectional control current supplied to the input circuit conductors 31, 32 is sufficiently large that the core of the magnetic amplifier 20 is reset to saturation during this interval by the reset current flowing through the condenser 33.

As soon as the core of the magnetic amplifier 19 saturates, the inductance of the amplifier winding 17 decreases rapidly to a relatively low value so that substantially the full value of input energizing voltage is now impressed across the upper half of the primary winding 15 of the output transformer 13. A larger current is now able to flow through the transformer primary winding and a voltage is induced in its output winding 14 to produce flow of load current. A substantially constant amplitude control voltage of pulse wave form is likewise induced in the winding 23 of the output transformer 13, and this voltage is applied between the emitter electrode and base electrode of the transistor 21 to maintain this transistor in its conductive state. At the same time, a similar voltage induced in the transformer winding 24 and similarly applied between the emitter electrode and base electrode of the transistor 22 maintains the latter non-conductive.

After a time interval dependent upon the volt-second magnetic characteristic of the core of the ouput transformer 13, the core of the output transformer saturates and the magnetic flux in the transfromer no longer increases. This results, for well known reasons, in reversal of the polarity of the control voltages developed in the transformer control windings 23 and 24 with the result that the transistor 21 becomes non-conductive and the transistor 22 becomes conductive. In a manner similar to that previously described, the major portion of the input energizing voltage is now impressed across the winding 18 of the magnetic amplifier 20 until the core of this amplifier saturates in opposite magnetic polarity. When this occurs, the major portion of the input energizing voltage is thereafter impressed across the lower half of the primary winding 15 of the transformer 13 to develop an opposite polarity voltage in the transformer winding 14 with resultant opposite polarity load current. The voltages induced in the magnetic amplifier winding 26 and output transformer winding 24 during this interval maintain the transistor 22 fully conductive, the voltage induced in the amplier winding 30 produces a current through the condenser 33 which resets the core of the magnetic amplifier 19, and the voltages induced in the magnetic amplifier winding 25 and the output transformer winding 23 maintain the transistor 21 non-conductive. When the core of the output transformer 13 now becomes saturated in opposite polarity by current conducted through the transistor 22, the voltages induced in the transformer windings 23 and 24 again reverse polarities to render the transistor 21 conductive and the transistor 22 non-conductive and initiate a new cycle of operation of the type first described. Thus the operation of the inverter is self oscillatory in nature to generate in the output winding 14 of the output transformer an alternating voltage and alternating load current of essentially rectangular pulse wave form.

It will be apparent that the period of each half cycle of the generated output alternating voltage is dependent upon the total time required for the core of the magnetic amplifier 19 and the core of the output transformer 13 to saturate in succession. This operating condition is graphically represented by the curves of FIG. 2a wherein the positive portion of curve A represents the voltage impressed across the amplifier winding 17 and the time interval $t_0$–$t_1$ required for the core of this amplifier device to reach a saturation value of one magnetic polarity. The negative portion of curve A similarly represents the voltage impressed upon the amplifier winding 18 and the time interval $t_2$–$t_3$ required for the core of this device to reach saturation. Curve B of FIG. 2a represents the positive polarity voltage pulse developed in the output winding 14 of the output transformer 13 during the interval $t_1$–$t_2$ required for the core of the output transformer 13 to reach saturation in one magnetic polarity. The negative voltage pulse of curve B is produced in the output winding 14 during the interval $t_3$–$t_4$ required for the core of the output transformer 13 to reach saturation in opposite magnetic polarity. It will be noted in this respect that both of the magnetic amplifiers 19 and 20 operate as self-saturating magnetic amplifiers requiring no external energization or drive.

The foregoing description of the inverter operation is premised upon the assumption that a sufficiently large value of unidirectional control current flows in the control circuit, comprised by the control circuit terminals 31 and 32, that each of the magnetic amplifiers 19 and 20 is reset by operation of the other. Consider now the changed character of operation when the value of control current is less than the minimum value required to permit full reset of each magnetic amplifier by the other. The control current is a unidirectional current upon which is superimposed second order and higher order even harmonics of reset current produced in response to the voltages induced in the amplifier windings 29 and 30 during each cycle of operation of the amplifiers. When the average or unidirectional value of this control current becomes less than that value at which each magnetic amplifier can be fully reset, the amplifier begins its cycle of operation with less than saturation remanence so that less time is required for it to reach saturation by reason of the voltage impressed across its energizing winding 17 or 18.

This operating condition is graphically represented in FIG. 2b for a relatively small but finite value of control current. Curve C represents the greatly reduced time interval $t_0$–$t'_1$ and $t'_2$–$t'_3$ required for the magnetic amplifiers 19 and 20 to saturate after a voltage is impressed across their respective energizing windings 17 or 18. Accordingly, an output pulse of voltage and load current begins much earlier in point of time with respect to the time $t_0$ and this pulse is followed after the relatively short interval $t'_2$–$t'_3$ by an output pulse of voltage and load current of opposite polarity. The period of one cycle of inverter operation is now the interval $t_0$–$t'_4$, which is appreciably shorter than the period $t_0$–$t_4$ represented in FIG. 2a for the operating condition first described and which involves complete reset of the cores of the magnetic amplifiers 19 and 20. Thus it will be evident that reduction of the unidirectional control current applied to the control circuit 31, 32 below the value required for complete reset of the amplifiers 19 and 20 has the effect of increasing the frequency of operation of the inverter. The maximum frequency is attained for a zero value of unidirectional control current, whereby the volt-second magnetic characteristic of the core of the output transformer 13 substantially alone establishes the frequency of operation and the positive and negative pulses of output voltage and load current follow one another in succession and without intervening delay. The output voltage averaged over a cycle of inverter operation is also larger for this condition of operation than it is for that initially described where the lowest frequency of inverter operation prevails as described in connection with the curves of FIG. 2a.

FIG. 3 is a circuit diagram of a direct-current to alternating-current inverter embodying the present invention in a modified form essentially similar to that of FIG. 1, similar circuit components being identified by similar reference numerals and analogous components by similar reference numerals primed. In the present arrangement, the output transformer 13' does not have a saturable core. Rather, a saturable core transformer 36 has an energizing winding 37 connected through a resistor 38 across the primary winding 15' of the output transformer 13'. The transformer 36 is provided with a control winding 23' which is connected in series with the amplifier winding 25 between the emitter and base electrodes of the transistor 21, and is provided with a control winding 24' which is connected in series with the amplifier winding 26 between the emitter and base electrodes of the transistor 22. The operation of this inverter arrangement is essentially similar to that described in connection with FIG. 1 but with one difference. Upon magnetic saturation of the amplifiers 19 and 20, the input energizing voltage in producing current flow through the primary winding 15' of the output transformer 13' induces a counter voltage across the terminals of the primary winding 15' and this counter voltage is impressed through the resistor 38 across the energizing winding 37 of the saturable core transformer 36. The time required for each half cycle of inverter operation is made up of the interval required for the magnetic amplifier 19 or the magnetic amplifier 20 to saturate together with the succeeding interval required for the output transformer 36 to saturate. Thus the latter affects the frequency of inverter operation in the same manner as does the transformer 13 of the FIG. 1 arrangement. The operation of the present arrangement is otherwise the same as that described in relation to FIG. 1 and will not be repeated.

Figure 4:
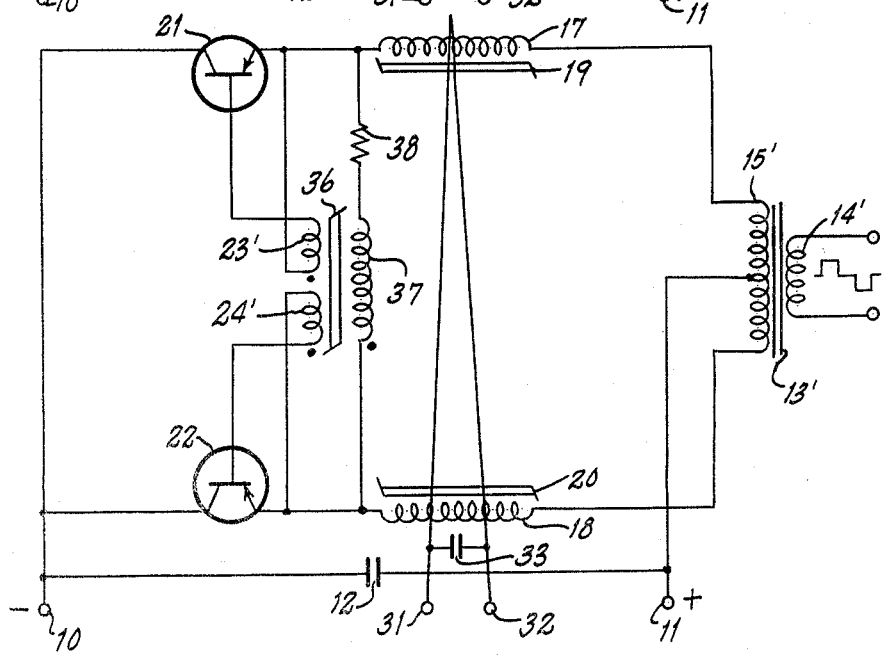
FIG. 4 is a circuit diagram of a direct-current to alternating-current inverter embodying a further modified form of the invention.

FIG. 4 is a circuit diagram of an inverter embodying a further modified form of invention essentially similar to that of FIG. 3, similar circuit components being identified by similar reference numerals, but with the difference that the energizing winding 37 of the saturable core transformer 36 is now connected through the resistor 38 between the emitter electrodes of the transistors 21 and 22. Further, the control windings 23' and 24' of the transformer 36 now along control the conductive and non-conductive state of the transistors 21 and 22. In this arrangement, the voltage impressed across the energizing winding 37 of the saturable core transformer 36 is relatively small until the magnetic amplifier 19 or 20 saturates, the conductivity of the respective transistors 21 or 22 being such under this condition of operation that a sufficient magnetizing current flows through the amplifier windings 17 or 18 for this purpose. As soon as the magnetic amplifier 19 or 20 saturates, however, substantially the full value of input energizing voltage is quickly impressed across the primary winding 15' of the output transformer 13'. This is for the reason that the maximum value of input energizing voltage becomes impressed across the energizing winding 37 of the saturable core transformer 36, so that the control voltage induced in the control winding 23' or 24' quickly renders the transistor 21 or 22 fully conductive during the interval required for the transformer 36 to change from magnetic saturation in one magnetic polarity to magnetic saturation in opposite magnetic polarity. The saturable core transformer 36 in the present arrangement is isolated electrically from the output transformer 13', and accordingly the volt-second magnetic characteristic of the transformer 36 is not appreciably affected by the magnitude of the load current supplied by the output transformer 13'. By reason of this, the frequency of operation of the present inverter is relatively independent of the load current and determined principally by the volt-second magnetic characteristics of the saturable core transformer 36 and amplifiers 17 and 18. The operation of the FIG. 4 inverter is otherwise essentially similar to that of FIG. 3.

While specific forms of the invention have been described for purposes of illustration, it is contemplated that numerous changes may be made without departing from the spirit of the invention.

What is claimed is:

1. A controllable self-oscillatory direct-current to alternating-current inverter comprising an input circuit for energization with unidirectional powder, means providing an alternating current output circuit and including a pair of controllable magnetic amplifiers having amplifier windings and including a pair of conductance-control devices having conductance electrodes serially included with individual ones of said amplifier windings in circuits coupling said input circuit to said output circuit with a polarity of coupling by one of said devices opposite to that of the other and with an average magnitude of coupling in each said polarity controllable by an individual one of said amplifiers, a magnetically saturable core energized alternately to opposite polarities of magnetic saturation by energy supplied through said amplifiers, and feed-back winding means magnetically coupled to said core for developing and applying to conductance-control electrodes of said devices regenerative conductance-control voltages to render said devices alternately and successively conductive and thereby render said inverted self-oscillatory while enabling an operating characteristic thereof to be controlled by control of said amplifiers.

2. A controllable self-oscillatory direct-current to alternating current inverter comprising an input circuit for energization with unidirectional power, means providing an alternating current output circuit and including two conductive paths coupling said input and output circuits, each of said conductive paths including in series an impedance control winding of a controllable magnetic amplifier and the conductive terminals of a unidirectional conductance-control device with the polarity of unidirectional conductance in one of said paths opposite to that in the other and with the time-average magnitude of unidirectional conductance in said paths controllable by the magnitude of a control current supplied to said amplifiers, a magnetically saturable core energized alternately to opposite polarities of magnetic saturation by energy supplied through said amplifiers, and feed-back winding means magnetically coupled to said core for developing and applying to conductance-control electrodes of said devices regenerative conductance-control voltages to render said devices alternately and successively conductive and thereby render said inverter self-oscillatory while enabling an operating characteristic thereof to be controlled by the magnitude of said control current.

3. A controllable self-oscillatory direct-current to alternating-current inverter comprising an input circuit for energization with unidirectional power, a transformer having an energizing winding and providing an alternating current output circuit, a pair of controllable magnetic amplifiers having amplifier windings and including a pair of conductance-control devices having conductance electrodes serially included with individual ones of said amplifier windings in circuits coupling said input circuit to said transformer winding with a polarity of coupling by one of said devices opposite to that of the other and with an average magnitude of coupling in each said polarity controllable by an individual one of said amplifiers, a magnetically saturable core energized alternately to opposite polarities of magnetic saturation by energy supplied through said amplifiers, and feed-back winding means magnetically coupled to said core for developing and applying to conductance-control electrodes of said devices regenerative conductance-control voltages to render said devices alternately and successively conductive and thereby render said inverter self-oscillatory while enabling an operating characteristic thereof to be controlled by control of said amplifiers.

4. A controllable self-oscillatory direct-current to alternating-current inverter comprising an input circuit for energization with unidirectional power, a saturable-core transformer having energizing and feed-back windings and a winding providing an alternating current output circuit, a pair of controllable magnetic amplifiers each having an amplifier winding and a feed-back winding, a pair of conductance-control devices having conductance electrodes coupling said input circuit through individual ones of said amplifier windings to said energizing winding with a polarity of coupling by one of said devices opposite to that of the other and with an average magnitude of coupling in each said polarity controllable by an individual one of said amplifiers, and conductive means connecting a feed-back winding of said transformer and a feed-back winding of said amplifiers in series additive phase and with regenerative polarity to conductance-control electrodes of each of said devices to render said devices alternately and successively conductive and thereby render said inverter self-oscillatory while enabling an operating characteristic thereof to be controlled by control of said amplifiers.

5. A controllable self-oscillatory direct-current to alternating-current inverter comprising an input circuit for energization with unidirectional power, a saturable-core transformer having energizing and feed-back windings and a winding providing an alternating current output circuit, a pair of magnetic amplifiers having amplifier and feed-back windings on magnetically saturable cores and having saturation control windings serially connected in a unidirectional control current circuit by-passed for alternating currents by a condenser, a pair of transistors having conductance terminals coupling said input circuit through individual ones of said amplifier windings to said transformer energizing winding with a polarity of coupling by one of said transistors opposite to that of the other and with an average magnitude of coupling in each said polarity controllable by the value of said unidirectional control current, and conductive means connecting a feed-back winding of said transformer and a feed-back winding of said amplifiers in series additive phase and with regenerative polarity to conductance-control terminals of each of said transistors to render said transistors alternately and successively conductive and thereby render said inverter self-oscillatory while enabling an operating characteristic thereof to be controlled by the value of said unidirectional control current.

6. A controllable self-oscillatory direct-current to alternating-current inverter comprising an input circuit for energization with unidirectional power, a transformer having an energizing winding and a winding providing an alternating current output circuit, a pair of controllable magnetic amplifiers having amplifier windings and including a pair of conductance-control devices having conductance electrodes serially included with individual ones of said amplifier windings in circuits coupling said input circuit to said energizing winding with a polarity of coupling by one of said devices opposite to that of the other and with an average magnitude of coupling in each said polarity controllable by an individual one of said amplifiers, a magnetically saturable core energized alternately to opposite polarities of magnetic saturation by a winding coupled across said amplifiers, and feed-back winding means magnetically coupled to said core for developing and applying to conductance-control electrodes of said devices regenerative conductance-control voltages to render said devices alternately and successively conductive and thereby render said inverter self-oscillatory while enabling an operating characteristic thereof to be controlled by control of said amplifiers.

7. A controllable self-oscillatory direct-current to alternating-current inverter comprising an input circuit for energization with unidirectional power, a transformer having an energizing winding and a winding providing an alternating current output circuit, a pair of controllable magnetic amplifiers having amplifier and feed-back windings, a pair of conductance-control devices having conductance terminals coupling said input circuit through individual ones of the amplifier windings of said amplifiers to said energizing winding with a polarity of coupling by one of said devices opposite to that of the other and with an average magnitude of coupling in each said polarity controllable by an individual one of said amplifiers, a magnetically saturable core energized alternately to opposite polarities of magnetic saturation by a winding coupled across said energizing winding, and conductive means connecting feed-back windings magnetically coupled to said core and feed-back windings of said amplifiers in series additive phase and with regenerative polarity to conductance-control terminals of each of said devices to render said devices alternately and successively conductive and thereby render said inverter self-oscillatory while enabling an operating characteristic thereof to be controlled by control of said amplifiers.

8. A controllable a self-oscillatory direct-current to alternating-current inverter comprising an input circuit for energization with unidirectional power, a transformer having an energizing winding and a winding providing an alternating current output circuit, a pair of controllable magnetic amplifiers having amplifier windings and a pair of conductance-control devices having conductance terminals coupling said input circuit through individual ones of said amplifier windings to said energizing winding with a polarity of coupling by one of said devices opposite to that of the other and with an average magnitude of coupling in each said polarity controllable by an individual one of said amplifiers, a magnetically saturable core energized alternately to opposite polarities of magnetic saturation by a winding coupled across said amplifiers and energized under control thereof, and feed-back winding means magnetically coupled to said core for developing and applying to conductance-control terminals of said devices regenerative conductance-control voltages to render said devices alternately and successively conductive and thereby render said inverter self-oscillatory while enabling an operating characteristic thereof to be controlled by control of said amplifiers.

9. A controllable self-oscillatory direct-current to alternating-current inverter comprising an input circuit for energization with unidirectional power, a transformer having an energizing winding and a winding providing an alternating current output circuit, a pair of controllable magnetic amplifiers having amplifier windings on magnetically saturable cores and having saturation control windings serially connected in a unidirectional control current circuit by-passed for alternating current by a condenser, a pair of conductance-control devices having conductance terminals coupling said input circuit through individual ones of said amplifier windings to said transformer energizing winding with a polarity of coupling by one of said devices opposite to that of the other and with an average magnitude of coupling in each said polarity controllable by the value of said unidirectional control current, a magnetically saturable core energized alternately to opposite polarities of magnetic saturation by a winding coupled through a current limiting impedance across said amplifier windings, and feed-back winding means magnetically coupled to said core for developing and applying to conductance-control terminals of said devices regenerative conductance-control voltages to render said devices alternately and successively conductive and thereby render said inverter self-oscillatory while enabling an operating characteristic thereof to be controlled by the value of said unidirectional control current.

10. A controllable self-oscillatory direct-current to alternating-current inverter comprising an input circuit for energization with unidirectional power, a transformer having an energizing winding and a winding providing an alternating current output circuit, a pair of controllable magnetic amplifiers having amplifier and feed-back windings on a magnetically saturable core and having saturation control windings serially connected in a unidirectional control current circuit by-passed for alternating current by a condenser, a pair of conductance-control devices having conductance terminals coupling said input circuit through individual ones of said amplifier windings to said transformer energizing winding with a polarity of coupling by one of said devices opposite to that of the other and with an average magnitude of coupling in each said polarity controllable by the value of said unidirectional control current, a magnetically saturable core energized alternately to opposite polarities of magnetic saturation by a winding coupled through a current limiting impedance across said transformer energizing winding, and conductive means connecting a feed-back winding on said core and a feed-back winding of said amplifiers in series additive phase and with regenerative polarity to conductance-control electrodes of indivdual ones of said devices to render said devices alternately and successively conductive and thereby render said inverter self-oscillatory while enabling an operating characteristic thereof to be controlled by the value of said unidirectional control current.

11. A controllable self-oscillatory direct-current to alternating-current inverter comprising an input circuit for energization with unidirectional power, a transformer having a center-tapped energizing winding and a winding providing an alternating current output circuit, a pair of controllable magnetic amplifiers having amplifier windings on individual magnetically saturable cores and having saturation control windings serially connected in a unidirectional control current circuit by-passed for alternating current by a condenser, a pair of unidirectional conductance-control devices individually serially connected through conductance terminals thereof with individual ones of said amplifier windings and individual halfs of said transformer energizing winding across said input circuit and with a polarity of conduction by one of said devices opposite to that of the other and an average magnitude of power conduction in each said polarity controllable by the value of said unidirectional control current, a magnetically saturable core energized alternately to opposite polarities of magnetic saturation by a winding coupled through a current limiting impedance across said amplifier windings, and feed-back winding means magnetically coupled to said core for developing and applying to conductance-control terminals of said devices regenerative conductance-control voltages to render said devices alternately and successively conductive and thereby render said inverter self-oscillatory while enabling an operating characteristic thereof to be controlled by the value of said unidirectional control current.

12. A controllable self-oscillatory direct-current to alternating-current inverter comprising an input circuit for energization with unidirectional power, a transformer having a center-tapped energizing winding and a winding providing an alternating current output circuit, a pair of controllable magnetic amplifiers each having amplifier and feed-back windings on a magnetically saturable core and having saturation control windings serially connected in a unidirectional control current circuit by-pass for alternating current by a condenser, a pair of unidirectional conductance-control devices individually serially connected through conductance terminals thereof with individual ones of said amplifier windings and individual halfs of said transformer energizing winding across said input circuit and with a polarity of conduction by one of said devices opposite to that of the other and an average magnitude of power conduction in each said polarity controllable by the value of said unidirectional control current, a magnetically saturable core energized alternately to opposite polarities of magnetic saturation by a winding cou- pled through a current limiting impedance across said transformer emergizing winding, and conductive means connecting individual feed-back windings on said core and individual feed-back windings, winding of said amplifiers in series additive phase and with regenerative polarity to conductance-control electrodes of individual ones of said devices to render said devices alternatively and successively conductive and thereby render said inverter self-oscillatory while enabling an operating characteristic thereof to be controlled by the value of said unidirectional control current.

13. A controllable self-oscillatory direct-current to alternating-current inverter comprising an input circuit for energization with unidirectional power, a transformer having a center-tapped energizing winding and a winding providing an alternating current output circuit, a pair of controllable magnetic amplifiers each having an amplifier winding on a magnetically saturable core and having saturation control windings serially connected in a unidirectional control current circuit by-passed for alternating current by a condenser, a pair of unidirectional conductance-control devices individually serially connected through conductance terminals thereof with individual ones of said amplifier windings and individual halfs of said transformer energizing winding across said input circuit and with a polarity of conduction by one of said devices opposite to that of the other and an average magnitude of power conduction in each said polarity controllable by the value of said unidirectional control current, a magnetically saturable core energized alternately to opposite polarities of magnetic saturation by a winding coupled through a current limiting impedance across the junctures of said amplifier windings and said devices, and a pair of feed-back windings magnetically coupled to said core for developing and applying to conductance-control terminals of individual ones of said devices regenerative conductance-control voltages to render said devices alternately and successively conductive and thereby render said inverter self-oscillatory while enabling an operating characteristic thereof to be controlled by the value of said unidirectional control current.

14. A controllable self-oscillatory direct-current to alternating-current inverter comprising an input circuit for energization with unidirectional power, a saturable-core transformer having energizing and feed-back windings and a winding providing an alternating current output circuit, a pair of controllable magnetic amplifiers each having amplifier and feed-back windings on a magnetically saturable core and having saturation control windings serially connected in a unidirectional control current circuit by-passed for alternating current by a condenser, a pair of unidirectional conductance-control devices individually serially connected through conductance terminals thereof with individual ones of said amplifier windings and individual halfs of said transformer energizing winding across said input circuit and with a polarity of conduction by one of said devices opposite to that of the other and with an average magnitude of power conduction in each said polarity controllable by the value of said undirectional control current, and conductive means connecting a feed-back winding of said transformer and a feed-back winding of said amplifiers in series additive phase and with regenerative polarity to conductance-control electrodes of said devices to render said devices alternately and successively conductive and thereby render said inverter self-oscillatory while enabling an operating characteristic thereof to be controlled by the value of said undirectional control current.

15. A controllable characteristic direct-current to alternating current inverter comprising an input circuit for energization with unidirectional power, a pair of magnetic amplifier devices each having an impedance control winding on a magnetically saturable core and a control winding, means including said control windings in series in a unidirectional energization control circuit by-passed for alternating currents by a condenser for effecting control of the dynamic impedance of said control windings in accordance with the magnitude of the undirectional current in said control circuit, a pair of power translating transistors each having conductance terminals and conductance control terminals, and means providing an alternating current output circuit energized from said input circuit through individual ones of said impedance control windings and the conductance terminals of individual ones of said transistors with the polarity of energization of said output circuit by one of said transistors opposite to that of the other and including feed-back winding portions connected to said conductance control terminals and coupled to a magnetically saturable core operated alternately between opposite polarities of saturation by energization supplied from said input circuit under control of said impedance-control windings to render the inverter self-oscillatory while varying a preselective operating characteristic thereof according to the magnitude of said unidirectional control current.

References Cited in the file of this patent
UNITED STATES PATENTS
2,971,126     Schultz _____ Feb. 7, 1961

OTHER REFERENCES

"Selected Semiconductor Circuits Handbook," by Seymour Schwartz, published by Wiley and Sons, Inc., January 22, 1960 pages 9–21, 9–22, 9–23.